Patented Apr. 2, 1940

2,196,042

UNITED STATES PATENT OFFICE 2,196,042

FIRE EXTINGUISHING FOAM STABILIZER

Lewis G. Morris Timpson, Plainfield, N. J., assignor to Pyrene Minimax Corporation, Newark, N. J., a corporation of Delaware No Drawing. Application February 1, 1938, Serial No. 188,065

14 Claims. (Cl. 23—11)

This invention relates to the production of fire extinguishing foam and to foam stabilizing agents which have been found to be particularly useful for this purpose.

In the production of fire extinguishing foam, it is common practice to utilize a stabilizing agent in conjunction with one or more of the ingredients used in making the foam, or to incorporate such an agent with the ingredients as the foam is being produced. Such agents serve to increase the volume of foam produced and to improve the qualities of the foam for fire extinguishing purposes. One important consideration in the selection of a foam stabilizing agent is that it be capable of forming a solution or uniform suspension in a suitable solvent which can be readily dispersed or dissolved in a liquid stream used for forming the foam under varying conditions of temperature. It is also highly desirable that the foam stabilizing agent be capable of forming a concentrated solution or dispersion in water having a reasonably low viscosity, especially in cases where the foam stabilizing agent is to be introduced into a liquid stream by aspiration. In addition, the foam stabilizing agent should be capable of producing a quality of foam which is stiff and capable of withstanding the foam deteriorating effects of hot vapors of oil, gasoline, or the like, to which the foam may be subjected when it is applied to a fire.

The production of the so-called "air foam" type of fire extinguishing foam (described in the Wagener Patent 1,821,914) is peculiarly dependent upon the use of a high quality foam stabilizing agent in order to produce foam which compares favorably with foam produced by the so-called "chemical" process, i. e., the reaction between a solution of a carbonate and a solution of an acid. In the production of air foam, the foam is obtained by incorporating air into a stream of water utilizing the aspirating action of such a water stream. The foam stabilizing agent may be mixed with the water prior to aspiration of the air, or may be mixed with the water simultaneously with the air. In any case, this method of producing foam requires the use of a high quality foam stabilizing agent and one which acts almost instantly to produce a large volume of stable foam for the amount of liquid employed.

One object of my invention is to provide foam stabilizing agents and a method of producing fire extinguishing foam utilizing such agents, which satisfies the foregoing requirements to a very high degree.

Another object of my invention is to utilize as a foam stabilizing agent, a product obtained by mixing an organic amine with a fatty acid, which product is capable of being dissolved or dispersed uniformly in water.

Another object of this invention is the utilization of a foam stabilizing agent for the production of fire extinguishing foam comprising the reaction product of a saturated fatty acid and an aliphatic water soluble amine.

The invention will be described in connection with several examples of foam stabilizing agents within the scope of my invention, but it is to be understood that it is not limited to the use of any particular amine or of any particular fatty acid, except as this may be necessary to produce a product capable of forming a solution or soap in water dispersion.

Inorganic soaps in general are known to have detergent and lathering properties. I have discovered, however, that amino soaps such as described herein are definitely superior to inorganic soaps as a class for the production of fire extinguishing foam, and particularly when used in the production of air foam. Such amino soaps are capable of forming concentrated uniform dispersions in water for storing and in some cases may be used or stored without admixture with water, since the reaction product or soap itself is a free flowing liquid.

As a class, I have found that the amino soaps have a much higher foam producing factor than corresponding inorganic soaps. By foam producing factor( I mean the number of gallons of foam which can be produced under ordinary conditions per gallon of foam stabilizing agent solution used in the production of air foam. For example, whereas inorganic soaps and similar materials have foam producing factors of around 400 to 500, amino soaps according to my invention are capable of factors ranging from 600 to as high as 1400 without sacrificing the desirable properties of the foam stabilizing agent itself, or of the quality of the foam produced.

A further advantage of the amino soaps of my invention is that they do not crystallize from a concentrated water dispersion upon chilling, as inorganic salts tend to do. Such a dispersion may become more viscous, even solidifying, upon being cooled, but it reverts very easily and quickly from a lard-like consistency to a free flowing oily consistency. Crystallizable foam stabilizing agents usually go back into solution with difficulty, thus presenting serious problems in transporting such agents in solution during cold weather.

A further advantage of the foam stabilizing agents of my invention is that solutions or dispersions thereof in water may have their minimum serviceable temperatures very substantially lowered by the addition of glycerine or a glycol such as a diethylene glycol or the ethers of diethylene glycol. Such addition agents, particularly diethylene glycol, may be employed without materialy lowering the foam producing power or factor of the stabilizing agents of this invention.

The amines useful for purposes of my invention include any of the organic amines which react with a fatty acid to produce a soap. Such amines may be primary, secondary, and in some cases the tertiary amines. Modified or substituted amines such as hydroxy amines and poly amines such as the diamines are also within the scope of my invention. A better product for purposes of this invention is obtained when the amine used is readily soluble in water, although water solubility is not essential to the reaction of the amine with a fatty acid. In general, the aliphatic amines are preferred because of their greater reactivity with fatty acids as compared with the aromatic amines. By aliphatic amines, I intend to include not only the simple aliphatic amines such as ethyl amine, amyl amine and the like, but also the lower molecular weight aromatic substituted aliphatic amines, such as benzylamine. Hydroxy-amines, such as mono-, di-, and triethanol amine have been found to be particularly suitable for preparing soaps useful for producing fire extinguishing foam. The diamines, such as ethylene diamine, may also be used with excellent results. Although not as reactive, the aromatic amines, such as aniline, have some value in the preparation of amino soaps, and consequently are not intended to be excluded from this invention. In fact a mixture of amines may advantageously be used containing a minor proportion of a less expensive aromatic amine such as aniline.

By the term fatty acids, I intend to include both saturated and unsaturated aliphatic acids, such as those of the methane series and the acetylene series, preferably acids containing more than five carbon atoms. Caproic acid is suitable as are others of this series, such as caprylic, capric, lauric, myristic, palmitic, and stearic acid. The foregoing are all saturated acids, having the type formula $C_nH_{2n}COOH$. Unsaturated acids, such as oleic, linoleic and ricinoleic produce useful stabilizing agents, and are especially useful when mixed with a saturated acid in promoting the reaction with the amine and in obtaining a free flowing product. For example, ricinoleic acid, when mixed in minor proportions with a saturated acid, acts like a solvent, holding other soaps formed from solidifying at reduced temperatures. The effective minimum serviceable temperature of the product is thereby lowered.

The best foam for extinguishing an oil fire in accordance with my invention is obtained by using a saturated fatty acid of the acetic series containing more than 5 and less than 20 carbon atoms as the major portion of the fatty acid. For commercial purposes I have found that a mixture of fatty acids derived from palm oils, such as palm kernel oil or cocoanut oil is particularly satisfactory. Such a mixture of fatty acids is preferably high in one of the saturated fatty acids mentioned above.

In preparing the amino soaps of my invention, different techniques may be used. The fatty acid may be reacted with the amine in equimolecular proportions. An amino soap thus formed will produce a better quality of air foam in warm weather. It may be desirable, however, for all around use to use a slight chemical excess of the amine in preparing the soap, especially with the fatty acids higher in their series, in order to obtain the desired free flowing qualities or low viscosity desired in the stabilizing agent at low temperatures.

In making the amino soap, a mixture of the amine and fatty acid is preferably agitated without heating until the desired reaction has taken place. The amine and fatty acid may be mixed together directly without the addition of water, and the reacted mixture or product then poured slowly into water with vigorous agitation. I prefer however, to add the fatty acid gradually to an amine-water mixture or solution with constant stirring. By either method, the desired concentrated dispersion of amino soap in water is obtained.

Several examples of stabilizing agents, or the ingredients thereof, will be given as illustrating my invention, it being understood that the invention is in no way limited thereto.

*Example I.*—One part by weight of a mixture of fatty acids derived from cocoanut oil and containing about 60% of lauric acid is mixed with one part by weight of commercial triethanol amine, which contains minor amounts of monoethanol and diethanolamine, and with two parts water. This mixture is reacted by adding the fatty acid mixture slowly and with stirring to the amine water solution. It is not necessary to add any heat and this is preferably avoided, especially when using the more volatile amines. The resulting product is a liquid of low viscosity comprising a soap in water dispersion. If a reaction product is obtained using these ingredients without the water, the product is a clear liquid at 40° F. and is capable of producing air foam directly with a factor in the neighborhood of 1400.

Small additions of a glycol, for example, about 5 to 20% of diethylene glycol or one of the ethers of diethylene glycol may be added to the amino soaps thus obtained or to the dispersion of this amino soap in water if it is desired to lower the minimum usable temperature.

*Example II.*—16 parts of a mixture of fatty acids derived from palm kernel oil is reacted with 7 parts ethylene diamine in the presence of 40 parts water. To this product is added about 8 parts of the mono butyl ether of diethylene glycol. Such a foam stabilizing agent as this may be used satisfactorily to produce air foam at a temperature as low as 5° F.

*Example III.*—A mixture of fatty acids comprising by weight 10 parts of fatty acid (principally lauric) derived from cocoanut oil to exclude palmitic and stearic acids, 4 parts fatty acid (principally myristic) derived from *Myristica venezuelensis,* and 4 parts of fatty acids derived from castor oil (principally ricinoleic) is reacted with 14 parts tri-ethanol amine and 4 parts aniline in 30 parts of water. The resultant foam stabilizing agent produces unusually high volumes of good quality fire extinguishing foam and can be used at low temperatures.

While the foam stabilizing agents of this invention have been described in connection with the production of air foam, they are also useful in the production of fire extinguishing foam of other types and by other methods. The foam stabilizing agents described herein, however, are particularly valuable for use in fire extinguishing foam producing apparatus such as described in my Patent Number 2,057,218, issued October 13, 1936, and in my copending applications Serial Nos. 742,042 and 15,010 filed August 30, 1934, and April 6, 1935, respectively.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A fire extinguishing foam stabilizing agent comprising an amino soap capable of being dissolved or dispersed in water, and a glycol.

2. A fire extinguishing foam stabilizing agent comprising a reacted mixture of an aliphatic amine and a saturated fatty acid containing more than 5 and less than 20 carbon atoms, and a small amount of diethylene glycol.

3. A fire extinguishing foam stabilizing agent comprising a reacted mixture of an ethanol amine and a fatty acid derived from a palm oil, and a small proportion of diethylene glycol.

4. A method of producing fire extinguishing foam in which a gas is aspirated by a jet of aqueous liquid to produce foam comprising the step of incorporating in said liquid a reacted mixture of an amine and a fatty acid, said reacted mixture being capable of being dissolved or dispersed in said liquid.

5. A method of producing fire extinguishing foam in which a gas is aspirated by a jet of aqueous liquid to produce foam comprising the step of incorporating in said liquid a reacted mixture of an aliphatic water soluble amine and a fatty acid containing more than 5 and less than 20 carbon atoms.

6. A method of producing fire extinguishing foam in which a gas is aspirated by a jet of aqueous liquid to produce foam comprising the step of incorporating in said liquid a reacted mixture of an aliphatic water soluble amine and a saturated acid of the acetic series containing more than 5 and less than 20 carbon atoms.

7. A method of producing fire extinguishing foam in which a gas is aspirated by a jet of liquid to produce foam comprising the step of incorporating in said liquid a reacted mixture of an amine and a fatty acid, said reacted mixture being capable of being dissolved or dispersed in said liquid, and a water miscible glycol.

8. A method of producing fire extinguishing foam in which a gas is aspirated by a jet of liquid to produce foam comprising the step of incorporating in said liquid a reacted mixture of an aliphatic water soluble amine and a fatty acid containing more than 5 and less than 20 carbon atoms, and 5 to 20% of diethylene glycol.

9. A method of producing fire extinguishing foam in which a gas is aspirated by a jet of aqueous liquid to produce foam comprising the step of incorporating in said liquid a product obtained by reacting a water soluble aliphatic hydroxy amine with a saturated fatty acid of the acetic series containing more than 5 and less than 20 carbon atoms.

10. A method of producing fire extinguishing foam in which a gas is aspirated by a jet of aqueous liquid to produce foam comprising the step of incorporating in said liquid a product obtained by reacting an ethanol amine with a saturated aliphatic acid of the acetic series containing from 6 to 18 carbon atoms.

11. A method of producing fire extinguishing foam in which a gas is aspirated by a jet of aqueous liquid to produce foam comprising the step of incorporating in said liquid a product obtained by reacting an aliphatic diamine with a saturated aliphatic fatty acid of the acetic series containing from 6 to 18 carbon atoms.

12. A fire extinguishing foam stabilizing agent comprising an amino soap capable of being dissolved or dispersed in water, and a substance from the class consisting of glycols and glycerine.

13. A fire extinguishing foam stabilizing agent comprising an amino soap capable of being dissolved or dispersed in water, and glycerine.

14. A method of producing fire extinguishing foam as defined in claim 10 in which the reactive mixture of an amine and a fatty acid contains a small proportion of a substance selected from the group consisting of glycols and glycerine.

LEWIS G. MORRIS TIMPSON.